United States Patent
Iwano

(10) Patent No.: US 9,669,876 B2
(45) Date of Patent: Jun. 6, 2017

(54) PARTING PORTION STRUCTURE FOR VEHICLE

(71) Applicant: TOYOTA JIDOSHA KABUSHIKI KAISHA, Toyota-shi, Aichi-ken (JP)

(72) Inventor: Yoshihiro Iwano, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/424,836

(22) PCT Filed: Sep. 24, 2013

(86) PCT No.: PCT/JP2013/075736
§ 371 (c)(1),
(2) Date: Feb. 27, 2015

(87) PCT Pub. No.: WO2014/077034
PCT Pub. Date: May 22, 2014

(65) Prior Publication Data
US 2015/0259012 A1    Sep. 17, 2015

(30) Foreign Application Priority Data

Nov. 16, 2012    (JP) .................................. 2012-252575

(51) Int. Cl.
*B62D 25/02* (2006.01)
*B62D 25/04* (2006.01)
*B62D 25/16* (2006.01)
*B62D 27/02* (2006.01)

(52) U.S. Cl.
CPC ............. *B62D 25/02* (2013.01); *B62D 25/04* (2013.01); *B62D 25/16* (2013.01); *B62D 27/02* (2013.01)

(58) Field of Classification Search
CPC ......... B62D 25/02; B62D 25/04; B62D 25/16
USPC ....................................................... 296/181.1
See application file for complete search history.

(56) References Cited

FOREIGN PATENT DOCUMENTS

| GB | 269428 A | 4/1927 |
|---|---|---|
| JP | S5861326 U | 4/1983 |
| JP | 2001-334959 A | 12/2001 |
| JP | 2005-096502 A | 4/2005 |
| JP | 2008-087616 A | 4/2008 |
| KR | 20-1998-0042584 U | 9/1998 |

*Primary Examiner* — H Gutman
(74) *Attorney, Agent, or Firm* — Andrews Kurth Kenyon LLP

(57) ABSTRACT

There is obtained a parting portion structure for a vehicle that can enhance the rigidity of one end of a design panel that constitutes a parting portion, while imparting a feeling of sharpness to the parting portion. An end edge portion of an upper-end rear portion of a fender panel is folded back toward the opposite side of a design surface and superimposed thereon. A return line of the end edge portion is arranged adjacent to a linear second ridgeline of a side outer panel, and linearly extends along the second ridgeline. Besides, superimposed regions of the end edge portion are joined to each other by an adhesive.

4 Claims, 4 Drawing Sheets

PRIOR ART

PARTING PORTION STRUCTURE FOR VEHICLE

CROSS-REFERENCE TO RELATED APPLICATIONS

This is a national phase application based on the PCT International Patent Application No. PCT/JP2013/075736 filed Sep. 24, 2013, claiming priority to Japanese Patent Application No. 2012-252575 filed Nov. 16, 2012, the entire contents of both of which are incorporated herein by reference.

TECHNICAL FIELD

The invention relates to a parting portion structure for a vehicle.

BACKGROUND ART

In a vehicle, a plurality of design panels are arranged adjacent to one another, and parting portions (boundaries) are formed among the design panels. For example, there is known a structure in which an upper-end rear portion of a fender panel is butted against a step portion of a front pillar outer plate to form a parting portion (e.g., see Patent Document 1). Then, for example, the upper-end rear portion of this fender panel is designed as a cut-off end surface, so a feeling of sharpness is imparted to the parting portion.

RELATED ART DOCUMENT

Patent Document

Patent Document 1: Japanese Patent Application Publication No. 2005-96502 (JP-2005-96502 A)

SUMMARY OF THE INVENTION

Problem to Be Solved by the Invention

However, there is room for improvement in enhancing the rigidity of one end of a design panel that constitutes a parting portion while imparting a feeling of sharpness to the parting portion.

In view of the aforementioned fact, it is an object of the invention to provide a parting portion structure for a vehicle that can enhance the rigidity of one end of a design panel that constitutes a parting portion while imparting a feeling of sharpness to the parting portion.

Means for Solving the Problem

A parting portion structure for a vehicle according to a first aspect of the invention has a first design panel and a second design panel. The first design panel constitutes a design surface of the vehicle, and is equipped with a linear ridgeline portion. The second design panel constitutes a design surface of the vehicle, forms a parting portion between the second design panel and the first design panel, and is equipped, on the parting portion side, with an end edge portion that is folded back toward an opposite side of the design surface and superimposed thereon. A return line of the end edge portion is arranged adjacent to the ridgeline portion, and linearly extends along the ridgeline portion.

With the parting portion structure for the vehicle according to the first aspect of the invention, the end edge portion of the second design panel is folded back toward the opposite side of the design surface and superimposed thereon, and the return line of the end edge portion is arranged adjacent to the linear ridgeline portion of the first design panel and linearly extends along the ridgeline portion. Therefore, the radius of curvature of an outer peripheral surface of a folded-back region of the end edge portion of the second design panel is minimized. As a result, a feeling of sharpness is imparted to the end edge portion of the second design panel, and the rigidity thereof is also enhanced.

A second aspect of the invention is obtained by modifying the parting portion structure for the vehicle according to the first aspect of the invention such that superimposed regions of the end edge portion are joined to each other.

With the parting portion structure for the vehicle according to the second aspect of the invention, the superimposed regions of the end edge portion are joined to each other, and hence are integrated with each other. Therefore, the rigidity of the end edge portion is further enhanced.

A third aspect of the invention is obtained by modifying the parting portion structure for the vehicle according to the first aspect of the invention or the second aspect of the invention such that the first design panel is equipped with a first constituent portion that forms the parting portion between the first constituent portion and the second design panel, a second constituent portion that is arranged adjacent to and opposed to the opposite side of the design surface of the second design panel, and a third constituent portion that couples adjacent end portions of the first constituent portion and the second constituent portion to each other, the ridgeline portion being formed at a boundary portion between the third constituent portion and the first constituent portion.

With the parting portion structure for the vehicle according to the third aspect of the invention, the first constituent portion of the first design panel forms the parting portion between the first constituent portion and the second design panel, and the second constituent portion of the first design panel is arranged adjacent to and opposed to the opposite side of the design panel of the second design panel. Then, in the first design panel, the adjacent end portions of the first constituent portion and the second constituent portion are coupled to each other by the third constituent portion, and the ridgeline portion is formed at the boundary portion between the first constituent portion and the third constituent portion. In contrast, the end edge portion of the second design panel is folded back toward the opposite side of the design surface, and is superimposed thereon. Therefore, if the difference in level between the first constituent portion and the second constituent portion in the first design panel can be ensured of a value equal to or larger than the double of the board thickness of the second design panel, the design surface of the first constituent portion of the first design panel and the design surface of the second design panel can be matched against each other.

A fourth aspect of the invention is obtained by modifying the parting portion structure for the vehicle according to the third aspect of the invention such that the first design panel is a side outer panel that constitutes a vehicle body lateral portion, and the second design panel is a fender panel that is arranged on a lateral surface of a vehicle body front portion, that the fender panel is equipped, at an upper-end rear portion thereof, with the return line of the end edge portion, and that the side outer panel is equipped with the first constituent portion whose front end portion is arranged above the upper-end rear portion of the fender panel, and the second constituent portion that is arranged below the first constituent portion with respect to the vehicle.

With the parting portion structure for the vehicle according to the fourth aspect of the invention, the first design panel is the side outer panel that constitutes the vehicle body lateral portion, and the second design panel is the fender panel that is arranged on the lateral surface of the vehicle body front portion. Besides, the fender panel is equipped with, at the upper-end rear portion thereof, with the return line. On the other hand, the first constituent portion is arranged at the front end portion of the side outer panel, above the upper-end rear portion of the fender panel, and the second constituent portion is arranged below the first constituent portion with respect to the vehicle. It should be noted herein that both the side outer panel and the fender panel are outer plates of the vehicle body lateral portion, so the clearance therebetween needs to be narrow in an area where the front end portion of the side outer panel and the rear portion of the fender panel are lined up in a vehicle width direction. In the invention, however, the increase in the thickness of the fender panel results only from the superimposition of the end edge portion. Therefore, if the difference in level between the first constituent portion and the second constituent portion in the side outer panel can be ensured of a value equal to or larger than the double of the board thickness of the fender panel, the design surface with no difference in level above and below the parting portion can be formed.

Effects of the Invention

As described above, the parting portion structure for the vehicle according to the first aspect of the invention has an excellent effect of making it possible to enhance the rigidity of one end of the design panel that constitutes the parting portion while imparting a feeling of sharpness to the parting portion.

The parting portion structure for the vehicle according to the second aspect of the invention makes it possible to further enhance the rigidity of the end edge portion of the second design panel by integrating the superimposed regions of the end edge portion of the second design panel with each other.

The parting portion structure for the vehicle according to the third aspect of the invention has an excellent effect of making it possible to easily set both the design surfaces that are arranged on both sides of the parting portion respectively without creating any difference in level, even when part of the first design panel is arranged adjacent to and opposed to the opposite side of the design surface of the second design panel.

The parting portion structure for the vehicle according to the fourth aspect of the invention has an excellent effect of making it possible to easily set the design surfaces of both the panels that are arranged above and below the parting portion between the side outer panel and the fender panel respectively, without creating any difference in level.

MODES FOR CARRYING OUT THE INVENTION

First Embodiment

A parting portion structure for a vehicle according to the first embodiment of the invention will be described using FIGS. 1 to 4B. Incidentally, an arrow FR shown in these drawings as appropriate indicates a vehicle front side, an arrow UP indicates a vehicle upper side, and an arrow IN indicates an inner side in a vehicle width direction.

Figure 1:
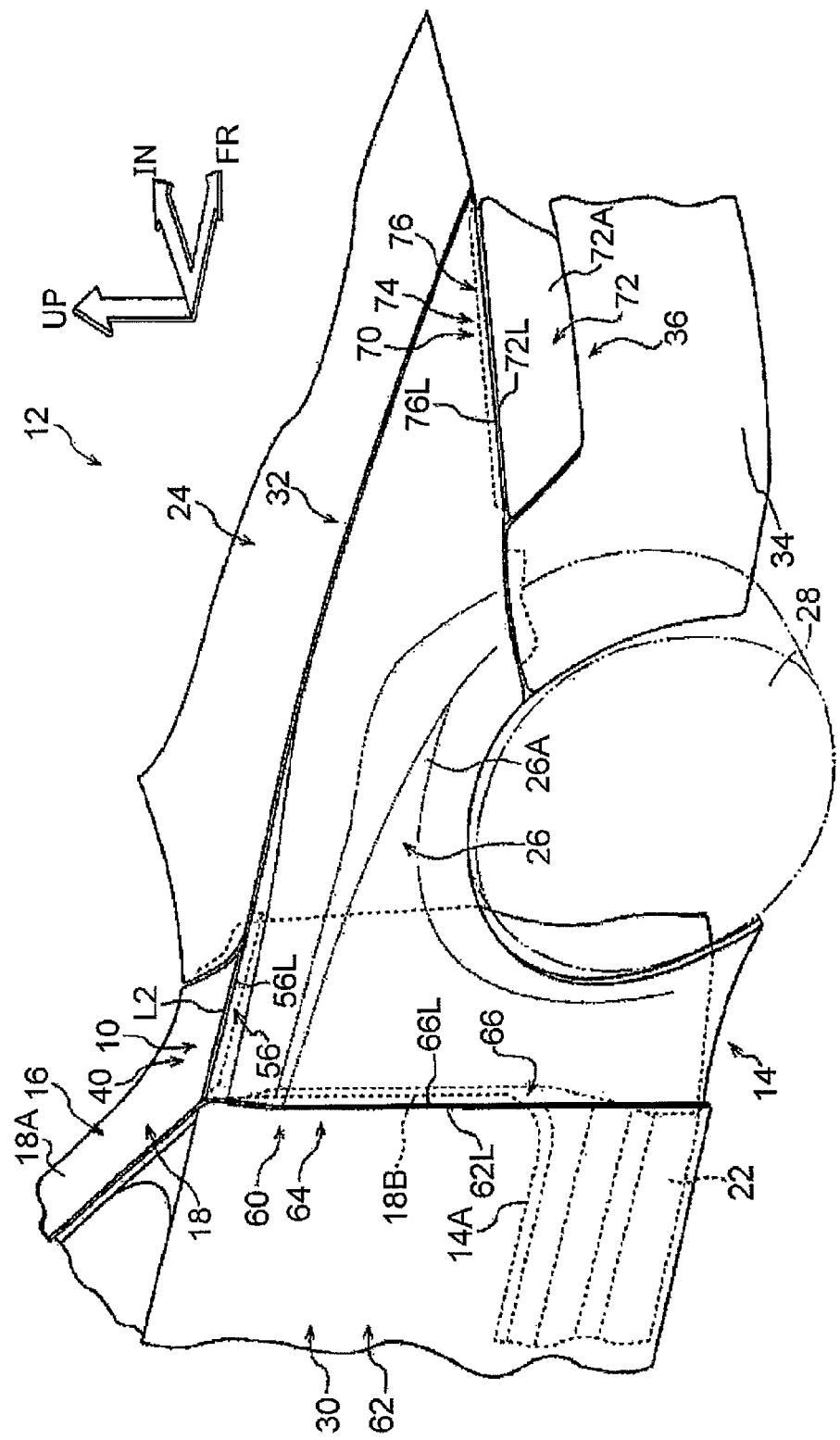
FIG. 1 is a perspective view showing a vehicle front portion to which a parting portion structure for a vehicle according to a first embodiment of the invention is applied.

In FIG. 1, part of a vehicle front portion 12 is shown as a perspective view. A parting portion structure 10 for a vehicle according to the present embodiment of the invention is applied to this vehicle front portion 12. First of all, a vehicle structure including the parting portion structure 10 for the vehicle will be generally described with reference to this FIG. 1.

As shown in FIG. 1, a front portion of a side outer panel 16 as a first design panel that constitutes a vehicle body lateral portion 14 is arranged at the vehicle front portion 12. The side outer panel 16 constitutes a design surface of the vehicle, and the front portion of the side outer panel 16 constitutes an outer plate portion of a front pillar 18 in front of a door opening portion 14A on a front side of the vehicle body lateral portion 14. Incidentally, the door opening portion 14A is covered with a side door 30 (which is, in a broad sense, an element grasped as "a vehicular opening/closing body") in an openable/closable manner.

A pillar upper portion 18A as an upper portion of the front pillar 18 is arranged at each of both end portions of a windshield (not shown) in a width direction thereof, and is inclined upward and rearward with respect to the vehicle. An upper end portion of the pillar upper portion 18A is linked with a front end portion of a roof side rail portion (not shown), and the roof side rail portion extends substantially along a vehicle longitudinal direction on each of both sides of a roof (not shown). On the other hand, a pillar lower portion 18B as a lower portion of the front pillar 18 is substantially vertically drooped downward with respect to the vehicle from a lower end portion of the pillar upper portion 18A. A lower end portion of the pillar lower portion 18B is linked with a front end portion of a rocker portion 22 (which is referred to also as "a side sill"). The rocker portion 22 extends along the vehicle longitudinal direction on each of both sides of a vehicle body floor (not shown):

Incidentally, each of both end portions of a cowl (not shown) that is extended in the vehicle width direction along a lower edge of the windshield is linked with an inner surface of a corresponding one of a pair of the right and left pillar lower portions 18B on an upper end portion side thereof. Besides, a hood 24 is provided in front of the cowl with respect to the vehicle. The hood 24 covers an engine room (not shown) of the vehicle front portion 12 from above, in an openable/closable manner.

A fender panel (which is referred to also as "a front fender panel") 26 as a second design panel is arranged on a lateral surface of a vehicle body front portion beside the hood 24. The fender panel 26 constitutes a design surface of the vehicle. A parting portion 32 as a boundary portion between the hood 24 and the fender panel 26 extends substantially along the vehicle longitudinal, direction. The fender panel 26 is equipped with an outer wall portion 26A that is arranged above a front wheel 28 and therearound to constitute a design surface, and an inner wall portion 26B (see FIG. 3) that is curved downward from the parting portion 32 between this outer wall portion 26A and the hood 24. Besides, an end portion of a bumper cover 34 is attached to a region of the fender panel 26 that is diagonally above and in front of the front wheel 28. A headlamp 36 (which is, in a broad sense, an element grasped as "a vehicular lighting fixture") is arranged adjacent to a front end portion side of the fender panel 26.

Figure 3:
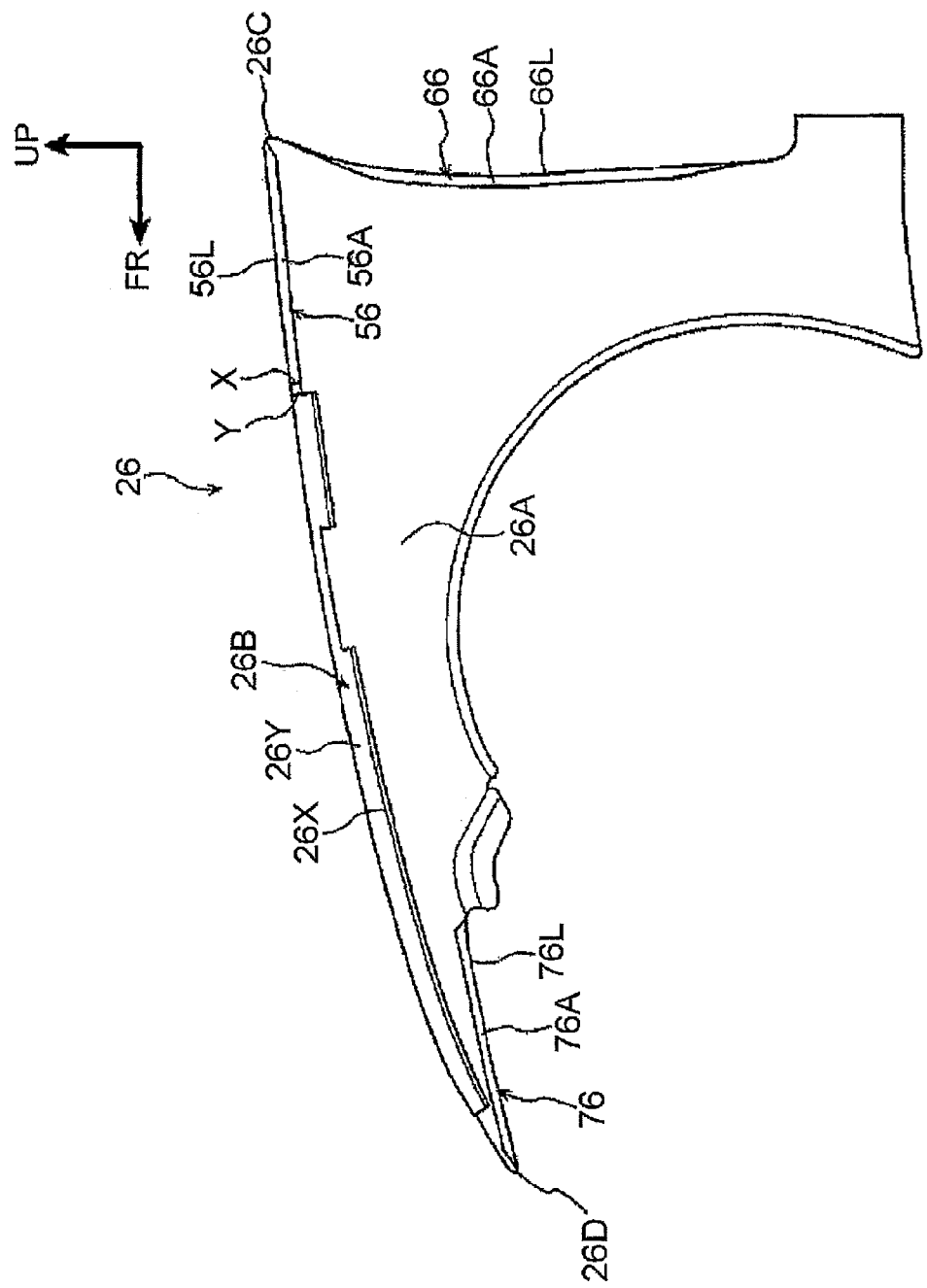
FIG. 3 is a perspective view showing a fender panel of FIG. 1 as viewed from the opposite side of a design surface.

FIG. 3 is a perspective view showing the fender panel 26 of FIG. 1 as viewed from the opposite side of the design surface. As shown in FIG. 3, the inner wall portion 26B of the fender panel 26 is equipped with an inner longitudinal wall portion 26Y that is drooped from an upper end portion of the outer wall portion 26A, and an inner flange portion 26X that is substantially horizontally extended inward in the vehicle width direction from a lower end portion of this inner longitudinal wall portion 26Y. Then, the distance from the inner longitudinal wall portion 26Y to the outer wall portion 26A in the vehicle width direction increases downward with respect to the vehicle. That is, an upper portion of the outer wall portion 26A and the inner longitudinal wall portion 26Y assume an inverted V-shape in a front view of the vehicle. Besides, only a board thickness region of the inner flange portion 26X is visible in FIG. 3.

The inner flange portion 26X is attached to an apron upper member (not shown) as a vehicle body skeleton member. Incidentally, the inner flange portion 26X may be fixed to the apron upper member either directly or via a bracket.

Figure 2:
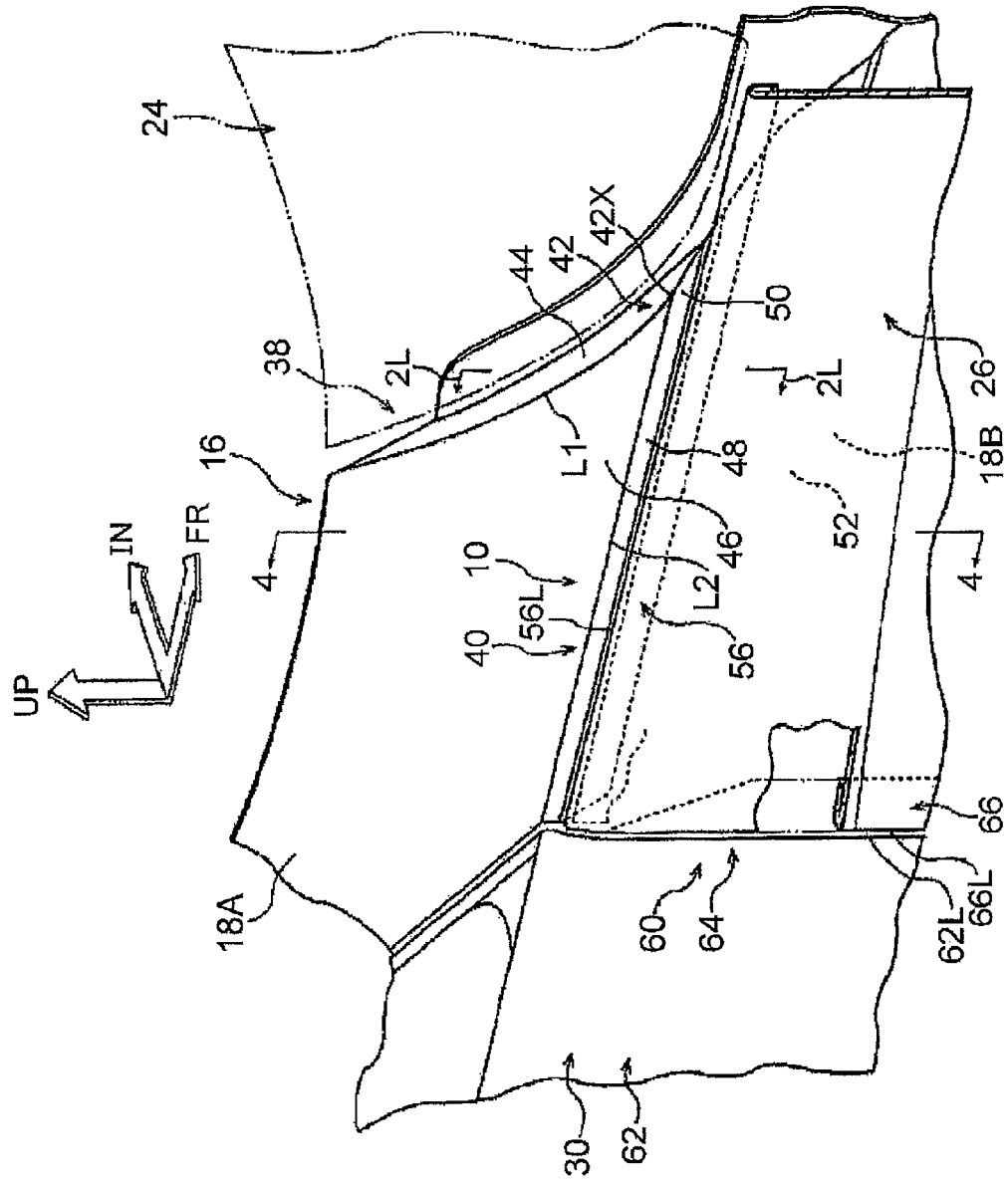
FIG. 2 is a perspective view showing, on an enlarged scale, an essential part of the parting portion structure for the vehicle according to the first embodiment of the invention.
Figure 4A:
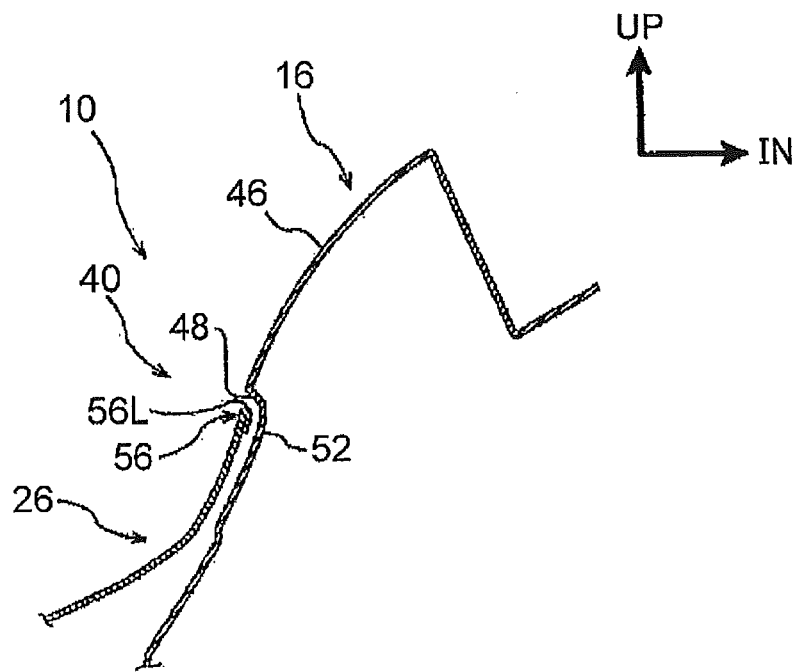
FIG. 4A is a cross-sectional view showing the parting portion structure for the vehicle according to one embodiment of the invention, as cut at a cutting position along a line 4-4 of FIG. 2.
Figure 4B:
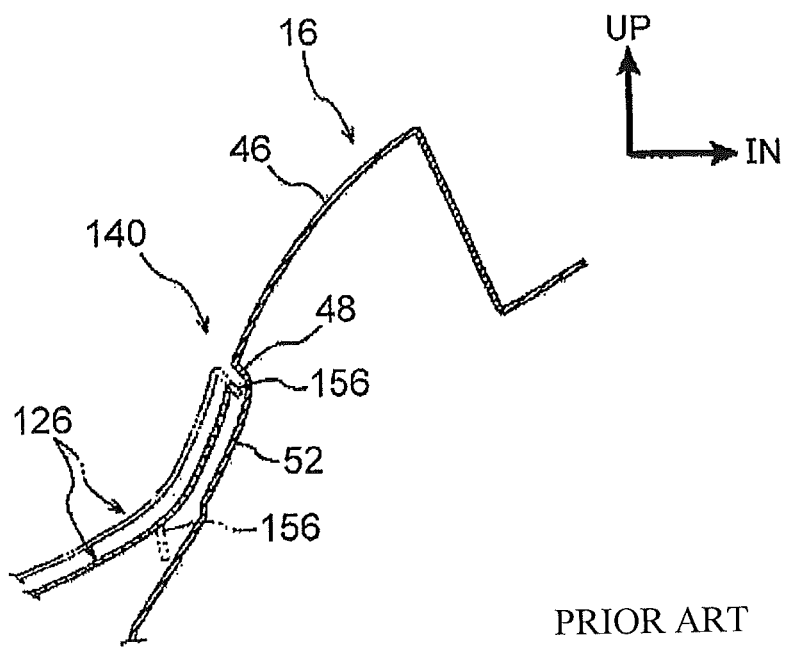
FIG. 4B is a cross-sectional view showing a comparative structure as cut at a cutting position similar to that of FIG. 4A.

Next, the parting portion structure 10 for the vehicle will be described in detail with reference to FIGS. 1 to 4B. FIG. 2 is a perspective view showing, on an enlarged scale, an essential part of the parting portion structure 10 for the vehicle. Besides, FIG. 4A is a view of a cross-section cut at a cutting position along a line 4-4 of FIG. 2. Incidentally, FIG. 4B is a cross-sectional view showing a comparative structure cut at the same cutting position as in FIG. 4A.

As shown in FIG. 2, the front end portion of the side outer panel 16 is equipped with an acute-angled corner portion 42 in front of the lower end portion of the pillar upper portion 18A. The corner portion 42 is formed sandwiched between a first ridgeline L1 that is inclined downward and forward with respect to the vehicle, and a second ridgeline L2 as a ridgeline portion that extends in the vehicle longitudinal direction and that intersects with the first ridgeline L1 at an acute angle. Besides, the side outer panel 16 has a cross-section that assumes the shape of a hat with upper and lower flanges. This cross-section, which is cut along a line 2L-2L in the drawing that is slightly behind an intersection point 42X of the first ridgeline L1 and the second ridgeline L2 with respect to the vehicle, opens inward in the vehicle width direction.

The first ridgeline L1 is substantially linearly formed, and is formed at a boundary portion between a front plate portion 44 that is arranged on a front surface of the lower end portion of the pillar upper portion 18A and a lateral plate portion 46 as a first constituent portion that is arranged on a lateral surface of the lower end portion of the pillar upper portion 18A. In other words, the front plate portion 44 and the lateral plate portion 46 form a flexed shape. The lateral plate portion 46 is formed continuously to the front plate portion 44 across the first ridgeline L1, and has a plate surface that is substantially directed outward in the vehicle width direction. In contrast, both sides of the rear end portion of the foregoing hood 24 in the vehicle width direction are arranged along the first ridgeline L1. A parting portion 38 is formed between the hood 24 and the lateral plate portion 46 of the side outer panel 16. Incidentally, in FIG. 2, the contour of the hood 24 is indicated by an alternate long and two short dashes line, and the front end of the side outer panel 16 is shown with this hood 24 represented in a perspective manner.

On the other hand, the second ridgeline L2 is linearly formed, and is formed at a boundary portion between the foregoing lateral plate portion 46 and a lower plate portion 48 as a third constituent portion that is arranged below the lateral plate portion 46. In other words, the lateral plate portion 46 and the lower plate portion 48 form a flexed shape. The lower plate portion 48 is arranged at a position adjacent to the pillar lower portion 18B at the lower end portion of the pillar upper portion 18A, and is formed continuously to the lateral plate portion 46 across the second ridgeline L2. This lower plate portion 48 extends in the vehicle longitudinal direction, and has a plate surface that is directed downward with respect to the vehicle and outward in the vehicle width direction.

Besides, the side outer panel 16 is equipped with a bead 50 that extends downward with respect to the vehicle from an intersection point 42X of the first ridgeline L1 and the second ridgeline L2, while being inclined forward with respect to the vehicle. The bead 50 is constituted of part of the front plate portion 44 and part of the lower plate portion 48 to form a V-shaped cross-section, and extends along an extension direction of the first ridgeline L1. Besides, a top ridgeline of the bead 50 is located in such a manner as to gradually move inward in the vehicle width direction as its distance from the intersection point 42X of the first ridgeline L1 and the second ridgeline L2 increases. That is, the height of the bead 50 in a convex direction gradually decreases as its distance from the intersection point 42X of the first ridgeline L1 and the second ridgeline L2 increases.

Besides, as shown in FIGS. 2 and 4A, an inner plate portion 52 as a second constituent portion that is flexed from an inner end of the lower plate portion 48 in the vehicle width direction and that extends downward with respect to the vehicle is formed. That is, adjacent end portions of the lateral plate portion 46 and the inner plate portion 52 (specifically a lower end portion of the lateral plate portion 46 and an upper end portion of the inner plate portion 52) are coupled to each other by the lower plate portion 48. The inner plate portion 52 has a plate surface that is substantially directed outward in the vehicle width direction, and forms a difference in level between itself and the lateral plate portion 46. The difference in level between the lateral plate portion 46 and the inner plate portion 52 in the side outer panel 16 is set larger than the double of the board thickness of the fender panel 26. The inner plate portion 52 is arranged below the lateral plate portion 46 with respect to the vehicle, and is arranged adjacent to and opposed to the opposite side of the design panel (an inner side in the vehicle width direction) of the fender panel 26.

In contrast, as shown in FIG. 2, an end edge portion 56 of an upper-end rear portion of the fender panel 26 is arranged along the second ridgeline L2 of the side outer panel 16. A parting portion 40 is formed between the fender panel 26 and the lateral plate portion 46 of the side outer panel 16. In other words, the lateral plate portion 46 of the side outer panel 16 is arranged above the end edge portion 56 of the upper-end rear portion of the fender panel 26. The end edge portion 56 of the upper-end rear portion of the fender panel 26 is arranged on the parting portion 40 side, and is folded back toward the opposite side of the design surface (curved by 180°) to be superimposed thereon as shown in FIGS. 2 to 4A. Opposed faces of superimposed regions of the end edge portion 56 are bonded to each other by an adhesive. Thus, the superimposed regions of the end edge portion 56 are joined to each other. Besides, as shown in FIG. 2, a return line 56L of this end edge portion 56 is arranged adjacent to the second ridgeline L2 of the side outer panel 16, and linearly extends along the second ridgeline L2. Incidentally, the return line 56L is a line that is formed by a fold-back top portion of the end edge portion 56.

As shown in FIG. 3, a fold-back terminal portion 56A that is folded back at the end edge portion 56 of the upper-end rear portion of the fender panel 26 and that is superimposed on the outer wall portion 26A is formed continuously to the inner longitudinal wall portion 26Y. Then, the opening angle with respect to the outer wall portion 26A gradually increases as the distance from the vehicle front side decreases, in a range from a boundary portion X between the fold-back terminal portion 56A and the inner longitudinal wall portion 26Y to a region Y that is displaced therefrom toward the vehicle front side by a predetermined distance. Incidentally, in the present embodiment of the invention, a rearmost position with respect to the vehicle for fixing the inner flange portion 26X, which is extended from a lower end of the inner longitudinal wall portion 26Y, to the apron upper member (not shown) is set as a position close to the fold-back terminal portion 56A. Thus, there is provided a structure for restraining the fold-back terminal portion 56A from being displaced in the vehicle width direction.

Besides, the fold-back terminal portion 56A has a uniform fold-back margin (a uniform length in the direction perpendicular to the return line 56L) that is superimposed on the outer wall portion 26A except at a terminal portion on the vehicle rear side. The terminal portion of the fold-back terminal portion 56A on the vehicle rear side has a fold-back margin that gradually decreases as its distance from the vehicle rear side decreases.

Operation and Effect

Next, the operation and effect of the aforementioned embodiment of the invention will be described.

As described above, the end edge portion 56 of the upper-end rear portion of the fender panel 26 is folded back toward the opposite side of the design surface and superimposed thereon. Then, as shown in FIG. 2, the return line 56L of the end edge portion 56 is arranged adjacent to the linear second ridgeline L2 of the side outer panel 16 and linearly extends along the second ridgeline L2. Therefore, the radius of curvature of the outer peripheral surface of the folded-back region of the end edge portion 56 of the fender panel 26 is maximized. As a result, a feeling of sharpness is imparted to the end edge portion 56, and the rigidity thereof is enhanced as well. Besides, a feeling of unity is obtained between the side outer panel 16 and the fender panel 26 that form the parting portion 40.

The radius of curvature of the outer peripheral surface of the folded-back region will now be supplementarily described. For example, with a comparative structure in which end portions of a design panel are folded back to sandwich another panel, the radius of curvature of the outer peripheral surface of the folded-back region of the design panel increases by a value needed to sandwich another panel. If the radius of curvature is thus large, the range curved in the shape of R (the range from a region that starts to be curved in the shape of R to the fold-back top portion) increases, for example, when the design surface side of the design panel is viewed from a direction perpendicular to the design surface. Therefore, the feeling of sharpness in the folded-back region decreases correspondingly. In contrast, according to the present embodiment of the invention, the end edge portion 56 of the fender panel 26 is folded back without sandwiching any other panel. Therefore, the radius of curvature of the outer peripheral surface of the folded-back region is held small, so the feeling of sharpness is enhanced.

Besides, the superimposed regions of the end edge portion 56 are joined to each other, and hence are integrated with each other. Therefore, the rigidity of the end edge portion 56 is further enhanced.

Besides, in the present embodiment of the invention, the side outer panel 16 has the lateral plate portion 46 that forms the parting portion 40 between itself and the fender panel 26, and the inner plate portion 52 that is arranged adjacent to and opposed to the opposite side of the design surface of the fender panel 26. Then, in the side outer panel 16, the adjacent end portions of the lateral plate portion 46 and the inner plate portion 52 are coupled to each other by the lower plate portion 48, and the second ridgeline L2 is formed at the boundary portion between the lateral plate portion 46 and the lower plate portion 48. In contrast, as described above, the end edge portion 56 of the upper-end rear portion of the fender panel 26 is folded back toward the opposite side of the design surface and superimposed thereon. In consequence, if the difference in level between the lateral plate portion 46 and the inner plate portion 52 in the side outer panel 16 can be ensured of a value equal to or larger than the double of the board thickness of the fender panel 26 as is the case with the present embodiment of the invention, the design surface of the lateral plate portion 46 of the side outer panel 16 and the design surface of the fender panel 26 can be matched against each other. That is, even if part of the side outer panel 16 is arranged adjacent to and opposed to the opposite side of the design surface of the fender panel 26, both the design surfaces that are arranged on both sides of the parting portion 40 respectively can be easily set without creating any difference in level therebetween.

A supplementary description will now be given. Both the side outer panel 16 and the fender panel 26 are outer plates of the vehicle body lateral portion. Therefore, there is no choice but to set the clearance (the space) between the side outer panel 16 and the fender panel 26 narrow in an area in which the front end portion of the side outer panel 16 and the rear portion of the fender panel 26 are lined up in the vehicle width direction. Then, for example, with a comparative structure in which an end edge portion 156 of the upper-end rear portion of a fender panel 126 is curved in an inverted-V shape as shown in FIG. 4B, if the height position of the end edge portion 156 and the position thereof in the vehicle width direction are set equal to those of the end edge portion 56 according to the present embodiment of the invention (see FIG. 4A), the bending margin becomes short. If the bending margin is thus short, the rigidity of the end edge portion 156 is not substantially enhanced, so the end edge portion 156 hits the inner plate portion 52 of the side outer panel 16 during traveling of the vehicle or the like, thereby generating an abnormal noise. Incidentally, although not shown in the drawing, a similar problem arises also in a structure in which the end edge portion 156 is not bent.

On the other hand, with the comparative structure, if the bending margin is set long in order to ensure the rigidity of the end edge portion 156, there is created a difference in level between the design surfaces above and below the parting portion 140 that is formed of the fender panel 126 and the side outer panel 16, as is the case with the fender panel 126 indicated by an alternate long and two short dashes line in the drawing. Besides, with the comparative structure, even in the case where the distance between the inner plate portion 52 of the side outer panel 16 and the end edge portion 156 is set long with the bending margin of the end edge portion 156 left unchanged, with a view to preventing the generation of an abnormal noise, there is created a difference in level between the design surfaces above and below the parting portion 140. With the structure in which the design surface at the end portion of the fender panel 126 adjacent to the side outer panel 16 is higher by one step as in these cases, the aesthetic quality (the appearance) of the parting portion 140 is not good.

Besides, with the comparative structure if the bending margin, of the end edge portion 156 is set long and the height position is lowered as is the case with the end edge portion 156 indicated by the alternate long and two short dashes line in the drawing in order to prevent a difference in level from being created between the design surfaces above and below the parting portion 140, the clearance between the end edge portion 156 and the lateral plate portion 46 becomes too wide. In this case, a large recess portion is formed between the end edge portion 156 and the lateral plate portion 46, so the aesthetic quality (the appearance) is not good.

In contrast, according to the present embodiment of the invention, even when the clearance between the side outer panel 16 and the fender panel 26 is narrow as shown in FIG. 4A due to the foregoing configuration, the design surface with no difference in level above and below the parting portion 40 can be formed while ensuring the rigidity of the end edge portion 56. Then, the rigidity of the end edge portion 56 is ensured while a gap is ensured between the side outer panel 16 and the fender panel 26, so the generation of an abnormal noise is prevented or effectively suppressed. Besides, the rigidity of the end edge portion 56 is ensured, so the performance of absorbing energy in the event of a collision and hence the performance of protecting pedestrians can also be improved.

As described above, with the parting portion structure 10 for the vehicle according to the present embodiment of the invention, the rigidity of one end of the fender panel 26 (the end edge portion 56 of the upper-end rear portion) that constitutes the parting portion 40 can be enhanced while imparting a feeling of sharpness to the parting portion 40. As a result, the quality of commodities can be enhanced.

Second Embodiment

Next, a parting portion structure 60 for a vehicle according to the second embodiment of the invention will be described using FIGS. 1 to 3. The parting portion structure 60 for the vehicle according to the present embodiment of the invention is applied to a parting portion 64 between a door outer panel 62 as the first design panel shown in FIGS. 1 and 2 and the fender panel 26 as the second design panel.

A front portion of the side door 30 shown in FIG. 1 is attached to the pillar lower portion 18B of the front pillar 18 via a door hinge portion (not shown). This side door 30 is configured to include the door outer panel 62 that constitutes the outer plate of the side door 30, and a door inner panel (not shown) that is arranged on a vehicle interior side with respect to the door outer panel 62 to constitute an inner plate of the side door 30. The door outer panel 62 constitutes a design surface of the vehicle. An outer peripheral portion of the door outer panel 62 is linked with an outer peripheral portion of the door inner panel through hemming.

Besides, a front ridgeline 62L as a linear ridgeline portion that is bent through hemming and that extends in the vehicle vertical direction is formed at a front end portion 62A of the door outer panel 62. The door outer panel 62 forms the parting portion 64 between itself and the fender panel 26 that is arranged in front of the door outer panel 62 with respect to the vehicle.

As shown in FIGS. 2 and 3, an end edge portion 66 of the fender panel 26 on the parting portion 64 side (i.e., on the vehicle rear side) is folded back toward the opposite side of the design surface (curved by 180°) and superimposed thereon. Incidentally, FIG. 2 shows a cross-sectional shape of the end edge portion 66 with part of the rear end portion of the fender panel 26 notched, in order to facilitate the understanding of the parting portion structure 60 for the vehicle. Opposed faces of superimposed regions of the end edge portion 66 are bonded to each other by an adhesive. Thus, the superimposed regions of the end edge portion 66 are joined to each other. As shown in FIGS. 1 and 2, a return line 66L of this end edge portion 66 is arranged adjacent to the front ridgeline 62L of the door outer panel 62, and linearly extends along the front ridgeline 62L. Incidentally, the return line 66L is a line that is formed by a fold-back top portion of the end edge portion 66.

Besides, as shown in FIG. 3, a fold-back terminal portion 66A that is folded back at the end edge portion 66 of the fender panel 26 on the vehicle rear side and that is superimposed on the outer wall portion 26A is formed non-continuously to the fold-back terminal portion 56A of the end edge portion 56 of the upper-end rear portion described in the first embodiment of the invention. Thus, there is provided a structure in which no strain results from the folding back of the end edge portions 56 and 66 at a corner portion 26C where the upper end and rear end of the fender panel 26 intersect with each other.

An intermediate portion of the fold-back terminal portion 66A in the vehicle vertical direction (a direction along the return line 66L) has a uniform fold-back margin that is superimposed on the outer wall portion 26A (a uniform length in the direction perpendicular to the return line 66L). A terminal portion of the fold-back terminal portion 66A on the vehicle upper side has a fold-back margin that gradually decreases as its distance from the vehicle upper side decreases. Besides, a terminal portion of the fold-back terminal portion 66A on the vehicle lower side has a fold-back margin that gradually decreases as its distance from the vehicle lower side decreases.

According to the aforementioned configuration, the radius of curvature of the outer peripheral surface of the folded-back region of the end edge portion 66 of the fender panel 26 on the vehicle rear side is minimized, so a feeling of sharpness is imparted to the end edge portion 66 and the rigidity thereof is enhanced as well. Besides, the superimposed regions of the end edge portion 66 are joined to each other, and hence are integrated with each other. Therefore, the rigidity of the end edge portion 66 is further enhanced.

As described above, according to the parting portion structure 60 for the vehicle shown in FIGS. 1 and 2, the rigidity of one end of the fender panel 26 (the end edge portion 66 on the vehicle rear side) that constitutes the parting portion 64 can be enhanced while imparting a feeling of sharpness to the parting portion 64. As a result, the quality of commodities can be enhanced.

Third Embodiment

Next, a parting portion structure 70 for a vehicle according to the third embodiment of the invention will be described using FIGS. 1 and 3. The parting portion structure 70 for the vehicle according to the present embodiment of the invention is applied to a parting portion 74 between a lamp lens 72 as the first design panel shown in FIG. 1 and the fender panel 26 as the second design panel.

The headlamp 36 shown in FIG. 1 is designed to irradiate an area in front of the vehicle, and is equipped with a housing (not shown) that accommodates a light source (not shown). The lamp lens 72 is disposed at an opening portion of the housing on the vehicle front side. The lamp lens 72 is formed of a transparent hard material, and constitutes a design surface of the vehicle. This lamp lens 72 is equipped with a lens body 72A that constitutes the design surface, and an attached portion (not shown) that is attached to the housing at an outer peripheral rear end portion of the lens body 72A.

An upper-end ridgeline 72L as a linear ridgeline portion that, is inclined inward in the vehicle width direction and forward with respect to the vehicle is formed at an upper end portion of the lens body 72A. The lens body 72A of the lamp lens 72 forms the parting portion 74 between itself and the fender panel 26 that is arranged above the lens body 72A with respect to the vehicle.

As shown in FIGS. 1 and 3, an end edge portion 76 of the fender panel 26 on the parting portion 74 side (i.e., on the vehicle front end portion side) is folded back toward the opposite side of the design surface (curved by 180°) and superimposed thereon. Opposed faces of superimposed regions of the end edge portion 76 are bonded to each other by an adhesive. Thus, the superimposed regions of the end edge portion 76 are joined to each other. As shown in FIG. 1, a return line 76L of this end edge portion 76 is arranged adjacent to the upper-end ridgeline 72L of the lamp lens 72, and linearly extends along the upper-end ridgeline 72L. Incidentally, the return line 76L is a line that is formed by a fold-back top portion of the end edge portion 76.

Besides, as shown in FIG. 3, a fold-back terminal portion 76A that is folded back at the end edge portion 76 of the fender panel 26 on the vehicle front end portion side and that is superimposed on the outer wall portion. 26A is formed non-continuously to the inner longitudinal wall portion 26Y of the upper end portion of the fender panel 26. Thus, there is provided a structure in which no strain results from the bending of the upper end portion and the folding back of the end edge portion 76, at a corner portion 261) where the upper end and front end of the fender panel 26 intersect with each other.

An intermediate portion of the fold-back terminal portion 76A along the return line 76L has a uniform fold-back margin that is superimposed on the outer wall portion 26A (a uniform length in the direction perpendicular to the return line 76L). An end portion of the fold-back terminal portion 76A on the vehicle front side has a fold-back margin that gradually decreases as its distance from the vehicle front side decreases. Besides, an end portion of the fold-back terminal portion 76A on the vehicle rear side has a fold-back margin that gradually decreases as its distance from the vehicle rear side decreases.

According to the aforementioned configuration, the radius of curvature of the outer peripheral surface of the folded-back region of the end edge portion 76 of the fender panel 26 on the vehicle front end portion side is minimized, so a feeling of sharpness is imparted to the end edge portion 76 and the rigidity thereof is enhanced as well. Besides, the superimposed regions of the end edge portion 76 are joined to each other, and hence are integrated with each other. Therefore, the rigidity of the end edge portion 76 is further enhanced.

As described above, according to the parting portion structure 70 for the vehicle shown in FIG. 1, the rigidity of one end of the fender panel 26 (the end edge portion 76 on the vehicle front end portion side) that constitutes the parting portion 74 can be enhanced while imparting a feeling of sharpness to the parting portion 74. As a result, the quality of commodities can be enhanced.

Supplementary Description of Embodiments

Incidentally, as a modification example of each of the aforementioned embodiments of the invention, the fender panel may be, for example, a fender panel having an upper rear portion through which a notch portion that is notched in a concavely scooped-out manner from the vehicle rear side so as to be used as a triangular window is formed. Besides, as another modification example, the fender panel may be, for example, a fender panel having an upper front portion through which a notch portion that is notched in a concavely scooped-out manner from the vehicle front side so as to arrange the lamp lens of the headlamp is formed.

Besides, as a modification example of each of the aforementioned embodiments of the invention, the first design panel may be a side outer panel, and the second design panel may be a resinous rocker molding whose upper end edge portion forms a parting portion between itself and the side outer panel. With this configuration, the side outer panel is equipped with a linear ridgeline portion below a rear lower portion of a rear-side door opening portion thereof. Besides, the rocker molding constitutes a design surface of the vehicle, and is equipped, on the parting portion side, with an end edge portion that is folded back toward the opposite side of the design surface and superimposed thereon. A return line of the end edge portion is arranged adjacent to the ridgeline portion of the side outer panel and linearly extends along the ridgeline portion.

Besides, as a modification example of each of the aforementioned embodiments of the invention, there may be adopted a configuration in which the superimposed regions of the end edge portion are joined to each other through welding or the like. Besides, as another modification example, it is also possible to adopt a configuration in which the superimposed regions of the end edge portion are not joined to each other.

Incidentally, the aforementioned embodiments of the invention and the aforementioned plurality of the modification examples can be appropriately combined with one another to be carried out.

While one example of the invention has been described above, it is obvious that the invention is not limited to the foregoing, and that the invention can further be carried out after being modified in various manners without departing from the gist thereof.

Incidentally, the entire disclosure of Japanese Patent Application No. 2012-252575 is incorporated in the present specification by reference.

The invention claimed is:

1. A parting portion structure for a vehicle, comprising:
a first design panel that constitutes a design surface of the vehicle and that is equipped with a linear first ridgeline portion;
a second design panel that constitutes a design surface of the vehicle, that forms a first parting portion between the second design panel and the first design panel, and that is equipped, on the first parting portion side, with a first end edge portion that is folded back toward an opposite side of the design surface and superimposed thereon, a return line of the first end edge portion being arranged adjacent to the first ridgeline portion of the first design panel and linearly extending along the first ridgeline portion of the first design panel; and
a third design panel that constitutes a design surface of the vehicle and that is equipped with a linear second ridgeline portion,
wherein the first edge portion is superimposed without sandwiching any other panel,
wherein the end edge portion is arranged adjacent to the first design panel with a gap,
wherein the second design panel forms a second parting portion between the second design panel and the third design panel,
wherein the second design panel is equipped, on the second parting portion side, with a second edge portion that is folded back toward an opposite side of the design surface and superimposed thereon,
wherein the first edge portion and the second edge portion intersects with each other at a corner of the second design panel, and
wherein a folded portion of the first edge portion is provided non-continuously to a folded portion of the second edge portion at the corner of the second design panel.

2. The parting portion structure for the vehicle according to claim 1, wherein
superimposed regions of the end edge portion are joined to each other.

3. The parting portion structure for the vehicle according to claim 1, wherein
the first design panel is equipped with
a first constituent portion that forms the parting portion between the first constituent portion and the second design panel,
a second constituent portion that is arranged adjacent to and opposed to the opposite side of the design surface of the second design panel, and
a third constituent portion that couples adjacent end portions of the first constituent portion and the second constituent portion to each other, the ridgeline portion being formed at a boundary portion between the third constituent portion and the first constituent portion.

4. The parting portion structure for the vehicle according to claim 3, wherein
the first design panel is a side outer panel that constitutes a vehicle body lateral portion, and the second design panel is a fender panel that is arranged on a lateral surface of a vehicle body front portion,
the fender panel is equipped, at an upper-end rear portion thereof, with the return line of the end edge portion, and
the side outer panel is equipped with the first constituent portion whose front end portion is arranged above the upper-end rear portion of the fender panel, and the second constituent portion that is arranged below the first constituent portion with respect to the vehicle.

* * * * *